Figure 1:
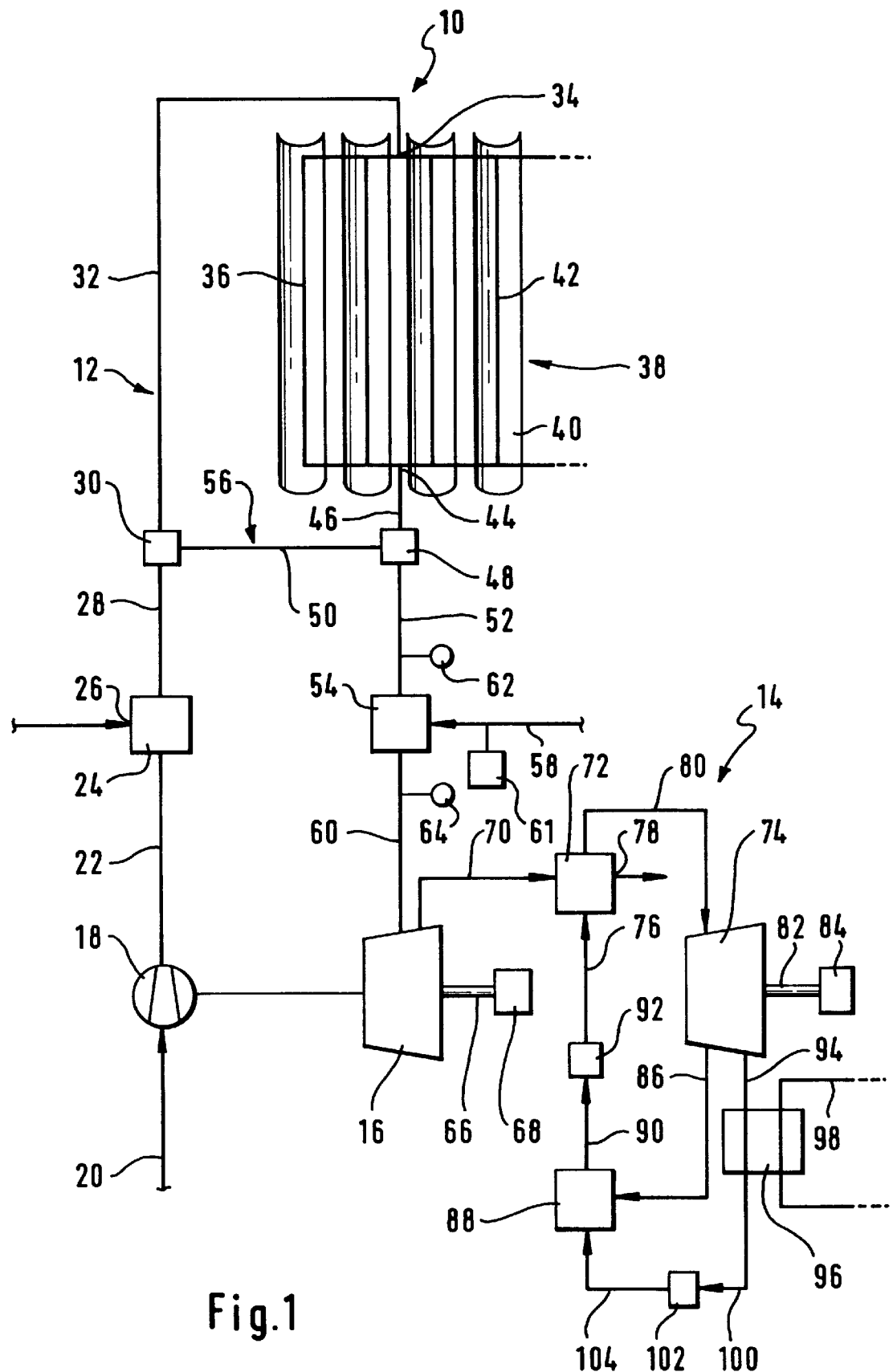

United States Patent
Steinmann

[11] Patent Number: 6,141,949
[45] Date of Patent: Nov. 7, 2000

[54] PROCESS AND APPARATUS USING SOLAR ENERGY IN A GAS AND STEAM POWER STATION

[75] Inventor: Wolf-Dieter Steinmann, Boeblingen, Germany

[73] Assignee: Deutsches Zentrum fuer Luft- und Raumfahrt e.V., Bonn, Germany

[21] Appl. No.: 08/989,945

[22] Filed: Dec. 12, 1997

[30] Foreign Application Priority Data

Dec. 12, 1996 [DE] Germany ............................ 196 51 645

[51] Int. Cl.[7] .................................. F02C 6/18; F02C 7/08
[52] U.S. Cl. .................... 60/39.02; 60/39.182; 60/39.33; 60/641.8
[58] Field of Search ................................ 60/39.02, 39.05, 60/39.182, 39.33, 641.8, 641.12; 126/663

[56] References Cited

U.S. PATENT DOCUMENTS

| | | | |
|---|---|---|---|
| 4,189,922 | 2/1980 | Bellofatto | 60/682 |
| 4,313,304 | 2/1982 | Hunt | 60/641.8 |
| 5,417,052 | 5/1995 | Bharathan et al. | |
| 5,513,488 | 5/1996 | Fan | 60/39.05 |
| 5,862,800 | 1/1999 | Marko | 126/680 |

FOREIGN PATENT DOCUMENTS 28 33 890  3/1980  Germany .

OTHER PUBLICATIONS

Gasparovic, Dr Ing N. et al., "Gas Turbines with Heat Exchanger and Water Injection in the Compressed Air," *Combustion*, Dec. 1972, pp. 32–40.

*Primary Examiner*—Louis J. Casaregola
*Attorney, Agent, or Firm*—Barry R. Lipsitz; Ralph F. Hoppin

[57] ABSTRACT

In order to create a process for using solar energy in a gas and steam power station, which incorporates a gas turbine circuit and a steam turbine circuit for converting thermal energy into mechanical work, whereby a compressed gaseous heat carrier which has been heated is fed to a gas turbine in the gas turbine circuit and waste gases from the gas turbine are used to generate steam, which is fed to a steam turbine in the steam turbine circuit, and whereby this process has a high efficiency rate for converting thermal energy into mechanical work and makes optimum use of the solar energy, it is proposed that thermal energy be supplied to the heat carrier in the gas turbine circuit by means of solar radiation.

28 Claims, 1 Drawing Sheet

PROCESS AND APPARATUS USING SOLAR ENERGY IN A GAS AND STEAM POWER STATION

The present disclosure relates to the subject matter disclosed in German Application No. 196 51 645.5 of Dec. 12, 1996, the entire specification of which is incorporated herein by reference.

The invention relates to a process for using solar energy in a gas and steam power station, which incorporates a gas turbine circuit and a steam turbine circuit for converting thermal energy into mechanical work, in which a compressed gaseous heat carrier which has been heated is fed to a gas turbine in the gas turbine circuit and waste gases from the gas turbine are used to generate steam, which, in the steam turbine circuit, is fed to a steam turbine.

The invention also relates to a gas and steam power station for converting thermal energy into mechanical work, which is used in particular for generating electric current, whereby this gas and steam power station incorporates a solar collector installation for the purpose of supplying thermal energy as well as a gas turbine circuit and a steam turbine circuit, wherein there is a combustion chamber in the gas turbine circuit and a compressed gaseous heat carrier which has been heated is fed to a gas turbine and wherein waste gases from the gas turbine are used to generate steam, which is fed, in the steam turbine circuit, to a steam turbine.

Such processes and devices are known from the state of the art.

The publication "Solar Powered Combined Cycle Plant" by K. Künstle, A. Lezuo and K. Reiter (Power-GEN Europe '94, Cologne, May 17–19, 1994) discloses a device for using solar energy in a gas and steam power station, whereby the solar collector installation acts as a steam generator and the steam turbine is thereby supplied with additional steam which is produced by means of solar radiation.

The disadvantage of this process is that the parallel generation of steam in two separate steam generators results in a high demand being made upon the overall control of the power station.

It is thus an object of the invention to provide a process for using solar energy in a gas and steam power station, whereby this process has a high efficiency rate for converting thermal energy into mechanical work and makes optimum use of the solar energy.

In the above-mentioned process, this object is achieved, according to the invention, by supplying the heat carrier in the gas turbine circuit with thermal energy by means of solar radiation.

With the arrangement according to the invention, it is only necessary to provide a single steam generator, which is connected to the gas turbine. A gas turbine has a higher efficiency rate for converting thermal energy into mechanical work than a steam turbine, whereby the efficiency rate of a gas turbine can, for example, be in the order of around 50%. This means that the solar energy can therefore be better used in the gas turbine circuit than in the steam turbine circuit. Steam turbines have an efficiency rate in the order of only 30%–35% and solar energy cannot therefore be put to optimum use in a device whereby water evaporates directly by means of solar radiation and the steam is then fed to the steam turbine.

In the process according to the invention, control is also simple, as the essential control value is the output temperature of the heat carrier when it leaves the solar collector installation and, due to the combustion chamber which is necessary anyway and is simple to control, it is easy to regulate an appropriate supply of additional thermal energy to the solar-heated heat carrier depending on its output temperature when it leaves the solar collector installation, in order to achieve optimum efficiency of the gas turbine. In the device according to the state of the art, on the other hand, the steam generated by means of the waste gases of the gas turbine and the steam generated through the solar collector installation must be controlled in such a way that the steam turbine receives the required flow mass of steam and this necessitates a complicated control arrangement.

The process according to the invention ensures single-phase flow as the heat carrier flows through the solar collector installation. In particular, this causes good heat transfer to the heat carrier in the conductor pipes of the solar collector installation. The flow conditions are less complex than in the case of dual-phase flow. In the device according to the state of the art, on the other hand, the solar collector installation must be supplied with water which evaporates there, and this results in a complex dual-phase flow of water in a fluid state and water that has evaporated.

A further advantage of the process according to the invention is that the plant components in the gas turbine circuit and in the steam turbine circuit are used at the same capacity during conditions of constant power output, so that there are no partial load losses. This applies irrespective of the proportions of thermal energy supplied to the heat carrier flowing into the gas turbine, by means of solar radiation or by means of heat supply in the combustion chamber. In the device according to the state of the art, on the other hand, the supply of thermal energy by means of solar radiation and the supply of thermal energy in a combustion chamber occur in parallel as there are two independent sources of steam generation, and either the gas turbine or the steam turbine will always operate at partial load, if the total output of the power station in all radiation conditions is to remain constant. This leads to reductions in the efficiency rate, particularly if the gas turbine is operating at partial load.

The steam turbine circuit of a gas and steam power station is a cost-determining factor of the plant. As the solar collector installation is situated in the gas turbine circuit, costs can be reduced at the same time as achieving optimum efficiency. This is because, unlike a gas and steam power station with direct evaporation, the components of the steam turbine circuit do not have to be larger than for a conventional power station (i.e. not using solar energy) of the same output range.

In the process according to the invention, there are no problems with additional waste heat. Solar collector installations are generally used in areas with high ambient temperatures. In the case of steam power stations or the steam circuit of a gas and steam power station, this leads to problems connected with the emission of heat in a condenser. By increasing the quantity of steam as occurs in the device according to the state of the art through the direct evaporation of water in a solar collector installation, a greater quantity of heat has to be removed in the condenser. In the process according to the invention, on the other hand, the quantity of steam is not increased in relation to a conventional steam turbine circuit which does not directly use solar energy.

It is advantageous if the heat carrier in the gas turbine circuit is fed through a solar collector installation in order to absorb thermal energy by means of solar radiation. This allows the heat carrier to absorb a large quantity of thermal energy.

According to a preferred embodiment, the solar collector installation comprises channel collectors. In this way, a tried and tested technology can be used. In particular, channel collectors have low area-specific energy densities, compared to power towers for example, which reduces material requirements and thus allows cost-effective use of the solar energy in a gas and steam power station.

It is particularly advantageous if the channel collectors are arranged in parallel, whereby the heat carrier can be divided to flow through many channel collectors. This enables maintenance and repair work to be carried out in sections of the solar field without having to close down the entire solar collector installation. It also enables the flow volume of heat carrier through the solar collector installation to be divided so that, in particular, flow volumes in a specific range can be achieved in individual channel collectors.

It is particularly advantageous if after absorbing thermal energy by means of solar radiation, the heat carrier is fed into a combustion chamber to absorb further thermal energy. This allows a first step whereby the heat carrier absorbs thermal energy by means of solar radiation and a second step whereby the quantity of thermal energy supplied ensures that the temperature of the heat carrier fed to the gas turbine permits operation of the gas turbine at an optimal efficiency rate.

It is advantageous if the heat carrier is compressed before it absorbs thermal energy, so that the pressure and temperature of the heat carrier are increased.

In a preferred modification of an embodiment, before the gaseous heat carrier absorbs thermal energy by means of solar radiation, water is sprayed into a compressed heat-carrying gas. The spray thereby evaporates and, as a result of this evaporation, the heat carrier, which comprises the heat-carrying gas and the evaporated water, cools down. This heat carrier travels in single-phase flow as the evaporated water is in gaseous form.

This cooled heat carrier can then absorb a larger quantity of thermal energy in the solar collector installation. In particular, this allows an increase in the solar proportion of the thermal energy supply to the heat carrier, which drives the gas turbine, if the solar collector installation has channel collectors, as the temperatures at which channel collectors can be used have an upper limit.

In addition, the superheated water vapour thereby increases the heat transfer from conductor pipes of the channel collectors of the solar collector installation to the heat carrier. The flow mass of the water sprayed in is 5% to 25% and, preferably 10% to 15%, of the flow mass of the compressed heat-carrying gas.

In a preferred embodiment of the process according to the invention, the spraying of water into the heat-carrying gas is controlled depending on an ambient temperature. Spraying water increases the flow mass of the heat carrier fed to the gas turbine. If the ambient temperature increases, a specific volume of the compressed heat-carrying gas which is compressed by a compressor increases. Since the flow volume in a gas turbine remains essentially constant, the flow mass of heat carrier decreases if the ambient temperature increases.

The efficiency rate of the gas turbine can thereby deteriorate, as it is no longer being operated with an optimum flow mass. By spraying water and thus increasing the flow mass fed to the turbine, this effect can be compensated and the output of the gas and steam power station according to the invention can be maintained constant even when there are variations in the ambient temperature. In a preferred embodiment of the invention, the spraying of water is controlled depending on the ambient temperature in such a way that the flow mass fed to the gas turbine is essentially constant.

Nothing has yet been stated regarding the operation of the combustion chamber in the gas turbine circuit. Advantageously, the operation of the combustion chamber is controlled in such a way that heat carrier heated in the combustion chamber and fed from the combustion chamber to the gas turbine has a nominal temperature. The nominal temperature is thereby specified by the embodiment of the gas turbine. By regulating the nominal temperature, the gas turbine can be operated at an optimum efficiency rate.

In order to control the combustion chamber and regulate the nominal temperature, the temperature of the heat carrier heated by means of solar radiation is determined by a first temperature sensor. A second temperature sensor determines the temperature of the heat carrier fed to the gas turbine, in order to monitor the nominal temperature.

Heat output from the combustion chamber is controlled through the temperature of the solar-heated heat carrier in such a way that the heat carrier is supplied with the quantity of thermal energy which heats it to the nominal temperature which is monitored by the second temperature sensor. On the one hand, this means that a high proportion of thermal energy, which can amount to 30%, is generated by means of solar radiation in the heat carrier which is fed to the gas turbine. On the other hand, it means that the gas turbine is driven with an optimum nominal temperature for achieving a high efficiency rate. Regulating this nominal temperature is simple, as essentially it is only necessary to determine the temperature of the heat carrier flowing out of the solar collector installation into the combustion chamber, in order to achieve optimum operation of the gas turbine.

In a preferred modification of an embodiment of the process according to the invention, the heat carrier, which is carried in one or several conductor pipes for the purpose of heating by means of solar radiation, is in the pressure range of around 15 bar to 35 bar. Conductor pipes which are designed for such a pressure range can be manufactured cost-effectively.

Air is preferably used as the heat-carrying gas.

In a preferred modification of an embodiment, a by-pass is provided, which allows the heat carrier to be fed into the combustion chamber, by-passing the solar collector installation. The heat carrier can thus be fed directly into the combustion chamber if significant maintenance or repair work is being carried out or if there are unfavourable weather conditions. This means in particular that no pressure losses arise through a long passage through pipes.

It is also an object of the invention to provide a gas and steam power station which has a high efficiency rate for converting thermal energy into mechanical work and ensures optimum use of the solar energy.

According to the invention, this object is achieved through a gas and steam power station according to the features of the preamble of Claim 18, in that the solar collector installation, through which the gaseous heat carrier is fed for the purpose of absorbing thermal energy by means of solar radiation, is situated in the gas turbine circuit.

This device according to the invention has the advantages already discussed in connection with the process according to the invention.

Preferred embodiments of the device according to the invention are the subject matter of Claims 19 to 28, the advantages of which have already been explained in connection with the preferred embodiments of the process according to the invention in Claims 2 to 17.

In the drawings, FIG. 1 shows an embodiment of a gas and steam power station according to the invention in a schematic representation.

An embodiment of a gas and steam power station according to the invention, which in its entirety is labelled 10 in FIG. 1, incorporates a gas turbine circuit 12 and a steam turbine circuit 14.

The gas turbine circuit 12 incorporates a gas turbine 16, which drives a compressor 18 for compressing a heat-carrying gas, in particular air. The gas turbine 16 can, for example, be a single-shaft gas turbine whereby the turbine simultaneously drives the compressor.

A pipe 20 flows into the compressor 18 and heat-carrying gas can be fed to the compressor through this pipe. A further pipe 22 leads from an outlet side of the compressor 18 into a water spraying device 24, whereby water can be sprayed into the flow of heat-carrying gas in pipe 22, whereby a mixture of superheated water vapour and heat-carrying gas form the gaseous heat carrier.

The water spraying device 24 has a water connection 26, which is connected to a water reservoir (not shown in the drawing). A further pipe 28 leads from an outlet side of the water spraying device 24 to an inlet of a three-way valve 30.

A further pipe 32 leads from a first outlet of the three-way valve 30 to a distributor 34.

Through this distributor 34, the flow of gaseous heat carrier can be divided between several pipes 36, which in particular are arranged in parallel. By means of these pipes 36, the gaseous heat carrier is fed through a solar collector installation, which in its entirety is labelled 38 in FIG. 1.

The solar collector installation 38 incorporates many channel collectors 40, which in particular are parabolic channel collectors. In a preferred embodiment of the invention, the individual channel collectors are arranged parallel to each other, so that the solar field gathering the solar radiation energy has a large surface.

According to the invention, it is provided in particular that channel collectors are used in line with the description in the German patent no. 196 08 138 of the "Deutsche Forschungsanstalt fuer Luft- und Raumfahrt e.V.", based on the patent application with reference 196 08 138.6-15, which was not pre-published. Reference is hereby expressly made to the content of this patent.

These channel collectors incorporate a longitudinally extending channel mirror, which reflects the radiation into a focus zone, and an absorber strand, which extends longitudinally through the focus zone of the channel mirror, wherein this absorber strand has a conductor pipe for the heat carrier and an absorber pipe surrounding the conductor pipe, in such a way that there is an annular space between the conductor pipe and the absorber pipe. An annular passage medium, which thermally couples the conductor pipe to the absorber pipe, flows in this annular space.

According to the invention, alternatively or additionally, the channel collectors can be used in the same way as in the German disclosure document DE 43 31 784 A1, to which express reference is hereby made. In these channel collectors, the conductor pipe is thermally coupled to the absorber pipe by means of a heat pipe.

Through the distributor 34, the flow of the gaseous heat carrier is divided between the individual channel collectors 40, whereby the heat carrier flowing inside an individual channel collector 40 is carried in conductor pipes 42.

The heat carrier which is fed through the individual channel collectors 40 and heated there is collected in a collector pipe 44 and is fed through a further pipe 46 to a first inlet of a further three-way valve 48. The second inlet of this three-way valve 48 is connected to a second outlet of the first three-way valve 30 by means of a pipe 50. An outlet of the three-way valve 48 leads through a pipe 52 into a combustion chamber 54.

The three-way valves 30 and 48 and the pipe 50 form a by-pass 56, which allows gaseous heat carrier or, if no water is sprayed, heat-carrying gas, to be fed directly from the pipe 28 into the combustion chamber 54, by-passing the solar collector installation 38.

The combustion chamber 54 is fuelled by fossil fuels, in particular natural gas, oil or coal. For this purpose, a fuel feed-pipe 58 to the combustion chamber 54 is provided.

From an outlet of the combustion chamber 54, a pipe 60 carries the gaseous heat carrier, which has been further heated in the combustion chamber 54, to the gas turbine 16.

In the pipe 52, there is a temperature sensor 62 which determines the temperature of the gaseous heat carrier flowing into the combustion chamber 54. In particular, the temperature sensor 62 determines the temperature to which the heat carrier was heated as it flowed through the solar collector installation 38.

In the pipe 60, there is a second temperature sensor 64, which determines the temperature of the heat carrier heated in the combustion chamber 54 and flowing to the gas turbine 16.

The combustion chamber 54 has a control and regulating unit 61, which controls the operation of the combustion chamber and in particular the supply of fuel through the fuel feed-pipe 58. The control and regulating unit 61 is connected to the first temperature sensor 62 and the second temperature sensor 64, so that the unit can register and process their signals.

In the gas turbine 16, the thermal energy of the gaseous heat carrier flowing into the gas turbine is converted into mechanical work. Through the mechanical work, a drive-shaft 66 of the gas turbine 16 is rotated. The drive-shaft can be connected to a generator 68 for converting mechanical work into electrical energy. Preferably a proportion of the mechanical work of the gas turbine 16 also drives the compressor 18 which compresses the heat carrier.

Waste gases from the gas turbine 16 are fed from the gas turbine by means of a waste gas pipe 70 to a waste heat boiler 72, which is situated in the steam turbine circuit 14. The waste heat boiler 72 acts as a heat exchanger between the waste gases from the gas turbine 16 and water in the steam turbine circuit 14, in order to generate steam which is fed to a steam turbine 74.

For this purpose, a pipe 76 feeds water in liquid form into the waste heat boiler 72. The gas flow in the waste heat boiler is carried in such a way that it causes the water to evaporate. The heat carrier, which has contributed to steam generation, is removed from the waste heat boiler 72 through an outlet 78. This output gas is, for example, removed through a chimney (not shown in the drawing). The residual heat of this output gas, which contains the remaining perceptible heat and the latent heat, may also be used in a residual heat exchanger.

The steam generated in the waste heat boiler 72 is fed through a pipe 80 to the steam turbine 74, where thermal energy is converted into mechanical work. The steam turbine 74 is connected by means of a shaft 82 for example to a generator 84 for example, for producing electric current.

A pipe 86 leads from the steam turbine 74 to a degasser 88. The degasser 88 removes steam, so that only water in liquid form is fed to the waste heat boiler 72. A pipe 90 connects the degasser 88 to an inlet side of a pump 92, whereby the outlet side of this pump is connected to the pipe 76, which leads to the waste heat boiler 72. The pump 92 ensures that the flow circuit is maintained in the steam turbine circuit 14.

A pipe 94 connects the steam turbine to a condenser 96. In this condenser 96, steam condenses to water. The heat thereby generated is taken away through a heat exchange medium by means of a pipe 98. A pipe 100 leads from an outlet side of the condenser to an inlet side of a condensate pump 102, and a pipe 104 leads from an outlet side of the condensate pump 102 to the degasser 88. The condensate pump 102 ensures that water condensed in the condenser 96 is fed back to the steam turbine circuit 14. By feeding this condensed water into the degasser 88 as a coolant, the degassing process is assisted.

The gas and steam power station according to the invention works as follows:

In the compressor 18, a heat-carrying gas, in particular air, is compressed. By means of a water spraying device 24, water is sprayed into this compressed matter, whereby the flow mass of the spray is preferably between 10% and 15% of the flow mass of the compressed heat-carrying gas. This gives rise to a gaseous mixture of air and superheated water vapour, which for example has a temperature of around 240° C. This gaseous mixture acts as a heat carrier and is fed through the pipes 28 and 32 to the solar collector installation 38.

Distributor 34 divides the flow mass of this mixture between channel collectors 40, and as it flows through the conductor pipes 42 of the respective channel collectors 40, it absorbs thermal energy by means of solar radiation. The pressure at which this gaseous heat carrier flows through the conductor pipes 42 of the solar collector installation 38 is preferably in the region of around 20 bar.

By means of solar radiation, the gaseous heat carrier, i.e. the mixture of air and superheated water vapour, can reach a temperature of around 500° C. to 550°0 C.

The spraying of water into the heat-carrying gas by means of the water spraying device 24 serves to cool the heat carrier fed to the solar collector installation 38. In this way, the heat carrier can absorb a greater quantity of thermal energy as it flows through the solar collector installation 38. This is particularly advantageous if the solar collector installation has channel collectors, as the temperature at which channel collectors can be used has an upper limit. Over all, by supplying water to the heat-carrying gas in order to form a gaseous heat carrier comprising a mixture of air and superheated water vapour, this allows a solar proportion of the thermal energy of the heat carrier which is fed to the combustion chamber 54 to be increased. The solar proportion can thereby lie in the region of 30%.

Furthermore, the superheated water vapour in the gaseous heat carrier improves the heat transfer between the fluid and walls of the conductor pipes 42 in the channel collectors 40 and the heat emission through walls of the conductor pipes 42 is reduced by the mixture.

The heat carrier heated in the channel collectors 40 of the solar collector installation 38 is collected in the collector pipe 44 and fed to the combustion chamber 54 in order to supply additional thermal energy. In the combustion chamber 54, the heat carrier is heated to the temperature at which the gas turbine 16 achieves an optimum efficiency rate. This heating process is controlled by the control and regulating unit 61, whereby the first temperature sensor 62 determines the temperature of the gaseous heat carrier heated in the solar collector installation 38, and the supply of fuel is controlled in such a way that the quantity of heat supplied to the heat carrier enables the heat carrier to reach the temperature necessary for optimum operation of the gas turbine 16. This temperature is monitored by means of the second temperature sensor 64.

According to the invention, the flow mass of the water sprayed into the gas turbine circuit 10 by means of the water spraying device 24 is controlled depending on an ambient temperature. If the ambient temperature increases, this leads to an increase in the specific volume of the air drawn in through pipe 20. The flow volume produced by the compressor 18 which is driven by means of the gas turbine 16 is essentially constant. Therefore, if the ambient temperature increases, this leads to a decrease in the flow mass through the gas turbine 16 and thus leads also to a decrease in the flow mass through the waste heat boiler 72. This can cause a reduction in the efficiency rate of a gas and steam power station, particularly since the gas turbine is not driven with an optimum flow mass. In the gas and steam power station according to the invention, the spraying of water by means of the device 24 causes an increase in the flow mass supplied to the gas turbine 16, so that a decrease in the nominal power of the gas and steam power station 10 can be offset by means of compensation of the reduction of the flow mass through increasing ambient temperature.

The by-pass 56 allows the gaseous heat carrier or heat-carrying gas to be carried from the compressor 18 directly to the combustion chamber 54, by-passing the solar collector installation 38. This is advantageous if significant maintenance or repair works to the solar collector installation 38 need to be carried out or when there are bad weather conditions. The gas and steam power station according to the invention can thus also be used as a conventional gas and steam power station.

Waste gases from the gas turbine 16 are used to generate steam in the steam turbine circuit 14. The thermal energy of the steam is converted into mechanical work in the steam turbine 74. The arrangement according to the invention whereby solar energy is used in a gas and steam power station provides for the solar energy to be used in the gas turbine circuit 10. The construction and operation of the steam turbine circuit 14 thus correspond to state of the art devices and processes, in which the steam circuit is closed.

What is claimed is:

1. A process for using solar energy in a gas and steam power station, which incorporates a gas turbine circuit and a steam turbine circuit for converting thermal energy into mechanical work, comprising the steps of:

feeding a heat carrier in the gas turbine circuit through a solar collector installation in order to absorb thermal energy by means of solar radiation, wherein the solar collector installation has channel collectors and wherein the channel collectors are arranged in parallel, whereby the heat carrier is divided to flow through several channel collectors, feeding a compressed gaseous heat carrier which has been heated to a gas turbine in the gas turbine circuit, using waste gases from the gas turbine to generate steam, and feeding the steam in the steam turbine circuit to a steam turbine.

2. A process according to claim 1 wherein after absorbing thermal energy by means of solar radiation, the heat carrier is fed into a combustion chamber to absorb further thermal energy.

3. A process according to claim 1 wherein the heat carrier is compressed before it absorbs thermal energy.

4. A process according to claim 3 wherein before the gaseous heat carrier absorbs thermal energy by means of solar radiation, water is sprayed into a compressed heat-carrying gas.

5. A process according to claim 4 wherein the flow mass of the water sprayed in is 5% to 25% of the flow mass of the compressed heat-carrying gas.

6. A process according to claim 5 wherein the spraying of water into the heat-carrying gas is controlled depending on an ambient temperature.

7. A process according to claim 6 wherein the spraying of water into the heat-carrying gas is controlled depending on the ambient temperature in such a way that the flow mass of heat carrier supplied to the gas turbine is essentially constant.

8. A process according to claim 2 wherein an operation of the combustion chamber is controlled in such a way that heat carrier which is heated in the combustion chamber and fed from the combustion chamber to the gas turbine has a preferred nominal temperature for peak operational efficiency.

9. A process according to claim 8 wherein the temperature of the heat carrier heated by means of solar radiation is determined by a first temperature sensor.

10. A process according to claim 9 wherein the temperature of the heat carrier fed to the gas turbine is determined by a second temperature sensor.

11. A process according to claim 10 wherein a heat output of the combustion chamber is controlled through the temperature of the heat carrier heated by solar radiation in such a way that the quantity of thermal energy supplied to the heat carrier heats it to the nominal temperature which is monitored by the second temperature sensor.

12. A process according to claim 1 wherein the heat carrier, which is carried in one or several conductor pipes for the purpose of heating by means of solar radiation, flows at a pressure in the range of around 15 bar to 35 bar.

13. A process according to claim 1 wherein air is used as the heat-carrying gas.

14. A process according to claim 1 wherein a by-pass is provided which allows the heat carrier to be fed into the combustion chamber, by-passing the solar collector installation.

15. A gas and steam power station for converting thermal energy into mechanical work, which is used in particular for generating electric current, comprising:

a gas turbine circuit;

a combustion chamber situated in the gas turbine circuit;

a steam turbine circuit, wherein a compressed gaseous heat carrier which has been heated is fed to a gas turbine and wherein waste gases from the gas turbine are used to generate steam, which is fed, in the steam turbine circuit, to a steam turbine; and a solar collector installation, through which the gaseous heat carrier is fed for the purpose of absorbing thermal energy by means of solar radiation, wherein the solar collector installation is situated in the gas turbine circuit, wherein the solar collector installation has channel collectors, and wherein the channel collectors are arranged in parallel, so that the heat carrier in the solar collector installation can be divided between several channel collectors.

16. A gas and steam power station according to claim 15 wherein the solar collector installation, in relation to the flow direction of the heat carrier, is situated in front of the combustion chamber.

17. A gas and steam power station according to claim 16 wherein a pipe between the solar collector installation and the combustion chamber incorporates a first temperature sensor, which allows the temperature of the heat carrier heated in the solar collector installation to be determined.

18. A gas and steam power station according to claim 17 wherein a pipe between the combustion chamber and the gas turbine incorporates a second temperature sensor, which allows the temperature of the heat carrier fed to the gas turbine to be determined.

19. A gas and steam power station according to claim 18 wherein a control and regulating unit is provided which controls the quantity of heat delivered to the heat carrier of the combustion chamber.

20. A gas and steam power station according to claim 19 wherein a control value for determining the quantity of heat to be delivered to the heat carrier by the control and regulating unit is the temperature of the heat carrier which is determined by the first temperature sensor.

21. A gas and steam power station according to claim 19 wherein a regulating value for regulating the quantity of heat to be delivered to the heat carrier by the control and regulating unit is the temperature of the heat carrier fed to the gas turbine.

22. A gas and steam power station according to claim 19 wherein the control and regulating unit controls the supply of thermal energy to the heat carrier in the combustion chamber depending on the temperature determined by the first temperature sensor such that the heat carrier fed to the gas turbine has a preferred nominal temperature for peak operational efficiency which is determined by the second temperature sensor.

23. A gas and steam power station according to claim 15 wherein the gas turbine circuit incorporates a water spraying device, which allows water to be sprayed into a heat-carrying gas flowing to the solar collector installation.

24. A gas and steam power station according to claim 23 wherein the water spraying device, in relation to the flow direction of the heat-carrying gas, is situated after a compressor.

25. A gas and steam power station according to claim 24 wherein the flow mass of the spray amounts to 5% to 25% of the flow mass of the compressed heat-carrying gas.

26. A gas and steam power station according to claim 15 wherein a by-pass is provided which allows heat carrier to be fed from the compressor to the combustion chamber, by-passing the solar collector installation.

27. A gas and steam power station according to claim 18 wherein air is used as the heat-carrying gas.

28. A gas and steam power station according to claim 15 wherein the heat carrier is fed through the solar collector installation in one or several conductor pipes at a pressure in the range of around 15 bar to 35 bar.

* * * * *